(12) United States Patent
Yamada et al.

(10) Patent No.: US 8,522,912 B2
(45) Date of Patent: Sep. 3, 2013

(54) RIDING TYPE MOWER RELAY SHAFT FOR BRAKING

(75) Inventors: Masahiro Yamada, Norcross, GA (US); Yoshikazu Togoshi, Osaka (JP); Eiji Sato, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/421,080

(22) Filed: Mar. 15, 2012

(65) Prior Publication Data

US 2013/0047568 A1 Feb. 28, 2013

(30) Foreign Application Priority Data

Aug. 25, 2011 (JP) ................. 2011-183742

(51) Int. Cl.
*B60K 26/00* (2006.01)
*B60T 7/00* (2006.01)
*B62D 1/22* (2006.01)

(52) U.S. Cl.
USPC .......................................... 180/325; 56/14.7

(58) Field of Classification Search
USPC ............... 180/325, 321, 370, 275, 6.36, 273, 180/336, 6.34, 14.7, 17.1, 14.9; 303/3, 2, 303/13; 188/106 P; 74/479.01, 480 R, 481, 74/482; 56/14.7, 17.1, 14.9
See application file for complete search history.

(56) References Cited

U.S. PATENT DOCUMENTS

| | | | |
|---|---|---|---|
| 4,759,417 A * | 7/1988 | Wanie et al. | 180/6.34 |
| 4,883,137 A * | 11/1989 | Wanie et al. | 180/6.34 |
| 5,022,477 A * | 6/1991 | Wanie | 180/6.34 |
| 5,136,899 A * | 8/1992 | Hoch et al. | 477/96 |
| 5,152,382 A * | 10/1992 | Hoch et al. | 192/218 |
| 6,973,768 B2 * | 12/2005 | Samejima et al. | 56/16.7 |
| 7,051,499 B2 * | 5/2006 | Goto et al. | 56/14.9 |
| 7,434,379 B2 * | 10/2008 | Nogami et al. | 56/17.1 |
| 7,451,587 B2 * | 11/2008 | Komiya et al. | 56/17.1 |
| 7,458,438 B2 * | 12/2008 | Nishino et al. | 180/305 |
| 7,562,515 B2 * | 7/2009 | Komorida et al. | 56/17.1 |
| 7,954,907 B1 * | 6/2011 | Wieber et al. | 303/3 |
| 2004/0154274 A1 * | 8/2004 | Samejima et al. | 56/1 |
| 2005/0044836 A1 * | 3/2005 | Goto et al. | 56/14.7 |
| 2007/0169456 A1 * | 7/2007 | Komorida et al. | 56/17.1 |
| 2007/0271895 A1 | 11/2007 | Nogami et al. | |
| 2012/0023886 A1 | 2/2012 | Minoura et al. | |

FOREIGN PATENT DOCUMENTS

JP 2007-312707 12/2007

* cited by examiner

*Primary Examiner* — Árpád Fábián-Kovács
(74) *Attorney, Agent, or Firm* — Greenblum & Bernstein, P.L.C.

(57) ABSTRACT

A relay shaft is rotatably provided in a lateral direction of a vehicle body on a rear side of the vehicle body with respect to a mowing apparatus and on a front side of the vehicle body with respect to a left and right pair of rear wheel drive apparatuses. A pedal coupling rod extends in the front-rear direction of the vehicle body above the mowing apparatus and connects to a brake pedal and to the relay shaft. A left brake coupling rod extends in the front-rear direction of the vehicle body and connects to a left end of the relay shaft and to an operation portion of a left rear wheel brake. A right brake coupling rod extends in the front-rear direction of the vehicle body and connects to a right end of the relay shaft and to an operation portion of a right rear wheel brake.

6 Claims, 13 Drawing Sheets

RIDING TYPE MOWER RELAY SHAFT FOR BRAKING

CROSS-REFERENCE TO RELATED APPLICATIONS

The present application claims priority under 35 U.S.C. §119 of Japanese Application No. 2011-183742, filed on Aug. 25, 2011, the disclosure of which is expressly incorporated by reference herein in its entirety.

BACKGROUND OF THE INVENTION

1. Field of the Invention

The present invention is related to a riding type mower configured with a self-propelled vehicle and a mowing apparatus. The self-propelled vehicle includes a driver step provided to a front portion of a vehicle body, an engine provided to a rear portion of the vehicle body, a left-right pair of rear wheel drive apparatuses provided on a front side of the vehicle body with respect to the engine and on a rear side of the vehicle body with respect to the driver step and transmitting drive force from the engine to each of a left-right pair of rear wheels, and a left-right pair of rear wheel brakes provided to the left-right pair of rear wheel drive apparatuses respectively. The mowing apparatus is raisably and lowerably provided on the front side of the vehicle body with respect to the left-right pair of rear wheel drive apparatuses below the driver step.

2. Description of Related Art

Conventionally, a riding type mower is known such as described in Related Art 1, for example. This riding type mower has an arm supporting shaft to which a brake arm constituting a brake pedal is integrally and rotatably fixed. Both ends of the arm supporting shaft are separately fixed to respective left and right side arms. Coupling the left and right side arms to operation portions of left and right rear wheel brakes via a coupling rod allows the brake pedal to control the left and right rear wheel brakes.

[Related Art 1] Japanese Patent Laid-open Publication No. 2007-312707

SUMMARY OF THE INVENTION

When the conventional technology is applied to the above-described riding type mower in order to control the left-right pair of rear wheel brakes with the brake pedal provided to a driver step, a mechanism coupling the brake pedal and the rear wheel brakes is more likely to have a large size. Specifically, when the conventional technology is applied, operation force from the brake pedal is divided and transferred by a pedal pivot (pivot of the brake pedal) to the left and right rear wheel brakes. Thus, coupling rods extending in a front-rear direction of the vehicle body need to be connected to the pedal pivot and to the operation portions of the left and right rear wheel brakes. The pedal pivot supports the brake pedal and is positioned on a front side of the vehicle body away from the rear wheel brakes. Thus, the coupling rods connecting the pedal pivot with the operation portions of the left and right rear wheel brakes tend to be long.

An advantage of the present invention is to provide a riding type mower that is capable of controlling a left-right pair of rear wheel brakes by controlling a brake pedal in a driver section while having a simple configuration.

One aspect of the present invention is related to a riding type mower including a self-propelled vehicle and a mowing apparatus. The self-propelled vehicle includes a driver step provided to a front portion of the vehicle body, an engine provided to a rear portion of the vehicle body, a left-right pair of rear wheel drive apparatuses provided on a front side of the vehicle body with respect to the engine and on a rear side of the vehicle body with respect to the driver step and transmitting drive force from the engine to each of a left-right pair of rear wheels, and a left-right pair of rear wheel brakes separately provided to the left-right pair of rear wheel drive apparatuses. The mowing apparatus is raisably and lowerably provided on the front side of the vehicle body with respect to the left-right pair of rear wheel drive apparatuses below the driver step. The riding type mower includes a coupling mechanism coupling a brake pedal provided to the driver step with operation portions of the left-right pair of rear wheel brakes. The coupling mechanism includes: a relay shaft; a pedal coupling rod; a left brake coupling rod; and a right brake coupling rod, the relay shaft being rotatably provided in a lateral direction of the vehicle on the rear side of the vehicle body with respect to the mowing apparatus and on the front side of the vehicle body with respect to the left-right pair of rear wheel drive apparatuses, the pedal coupling rod extending in the front-rear direction of the vehicle body above the mowing apparatus and connecting to the brake pedal and to the relay shaft, the left brake coupling rod extending in the front-back direction of the vehicle body and connecting to a left end of the relay shaft and to the operation portion of the left rear wheel brake, and the right brake coupling rod extending in the front-back direction of the vehicle body and connecting to a right end of the relay shaft and the operation portion of the right rear wheel brake.

According to the configuration of the present invention, operation force of the brake pedal is transmitted to the relay shaft by the pedal coupling rod, the relay shaft being provided on the rear side of the vehicle body with respect to the mowing apparatus and on the front side of the vehicle body with respect to the left-right pair of rear wheel drive apparatuses. The operation force is branched into a left force and a right force by the relay shaft. The left branched operation force is transmitted to the operation portion of the left rear wheel brake by the left brake coupling rod. The right branched operation force is transmitted to the operation portion of the right rear wheel brake by the right brake coupling rod. Thus, in this configuration, the left and right brake coupling rods connecting to the operation portions of the rear wheel brakes have a shorter length as compared to left and right coupling rods connecting to operation portions of rear wheel brakes in a configuration in which operation force is branched into left force and right force by a pedal pivot. Therefore, while having a coupling mechanism with a simple structure such as above, it is possible to control the left-right pair of rear wheel brakes by controlling the brake pedal.

Accordingly, the present invention can be achieved with a smaller cost by employing a coupling mechanism with a simple structure despite its capability of applying a brake to the self-propelled vehicle by controlling the left-right pair of rear wheel brakes with the brake pedal in the driver section.

In the riding type mower according to another aspect of the present invention, each operation portion of each of the left-right pair of rear wheel brakes is provided above a driving case of each of the rear wheel drive apparatuses. Further, a drive transmission belt wraps around each input pulley provided to each of the left-right pair of rear wheel drive apparatuses and an output pulley integrally and rotatably provided to an output shaft of the engine, each of the input pulleys being provided on the upper surface side of each driving case on an internal side in the lateral direction of the vehicle body with respect to each operation portion.

According to the configuration of the invention above, the operation portions of the left-right pair of rear wheel brakes are provided above the driving cases of the rear wheel drive apparatuses. Thus, the brake coupling rods connecting to the operation portions can be provided as high as possible away from the ground. Further, it is also possible to provide the drive transmission belt as high as possible away from the ground while avoiding interruption between the brake coupling rod and the drive transmission belt by providing both the input pulleys of the left-right pair of rear wheel drive apparatuses on the upper surface side of the driving cases and on the internal side in the lateral direction of the vehicle body with respect to the operation portions.

Accordingly, in the present invention, while the operation force is transmitted to the operation portions by the brake coupling rods and the drive force is transmitted to the rear wheel drive apparatuses by the drive transmission belt, the brake coupling rods and the drive transmission belt can be provided as high as possible away from the ground so that the brake coupling rods and the drive transmission belt are less likely to hit bouncing stones and the like.

In the riding type mower according to another aspect of the present invention above, a cutting blade transmission belt wraps around cutting blade drive pulleys and an output pulley, the cutting blade drive pulleys being provided on an upper surface side of a cutting blade housing of the mowing apparatus, and the output pulley being integrally and rotatably provided to the output shaft of the engine; and the cutting blade transmission belt passes below the relay shaft and the drive transmission belt between the left-right pair of rear wheel drive apparatuses.

According to the configuration of the invention above, the mowing apparatus is raised and lowered. When the mowing apparatus side of the cutting blade transmission belt is raised or lowered with the engine side thereof as a pivot, a portion of the cutting blade transmission belt between the engine side and the mowing apparatus side is raised or lowered below the relay shaft and the drive transmission belt between the left-right pair of rear wheel drive apparatuses. Accordingly, it is possible to raise the mowing apparatus to a relatively high position away from the ground while preventing the cutting blade transmission belt from contacting the rear wheel drive apparatuses, the drive transmission belt and/or the relay shaft with a portion thereof between the engine side and the mowing apparatus side so that the mowing apparatus side of the cutting blade transmission belt does not bend upward with respect to the engine side Accordingly, while the present invention employs a relay shaft provided on the rear side of the vehicle body with respect to the mowing apparatus and on the front side of the vehicle body with respect to the rear wheel drive apparatuses and transmits drive force from the engine to the mowing apparatus using the cutting blade transmission belt, it is possible to raise the mowing apparatus higher during moving/driving so as not to hit bumps on the ground.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
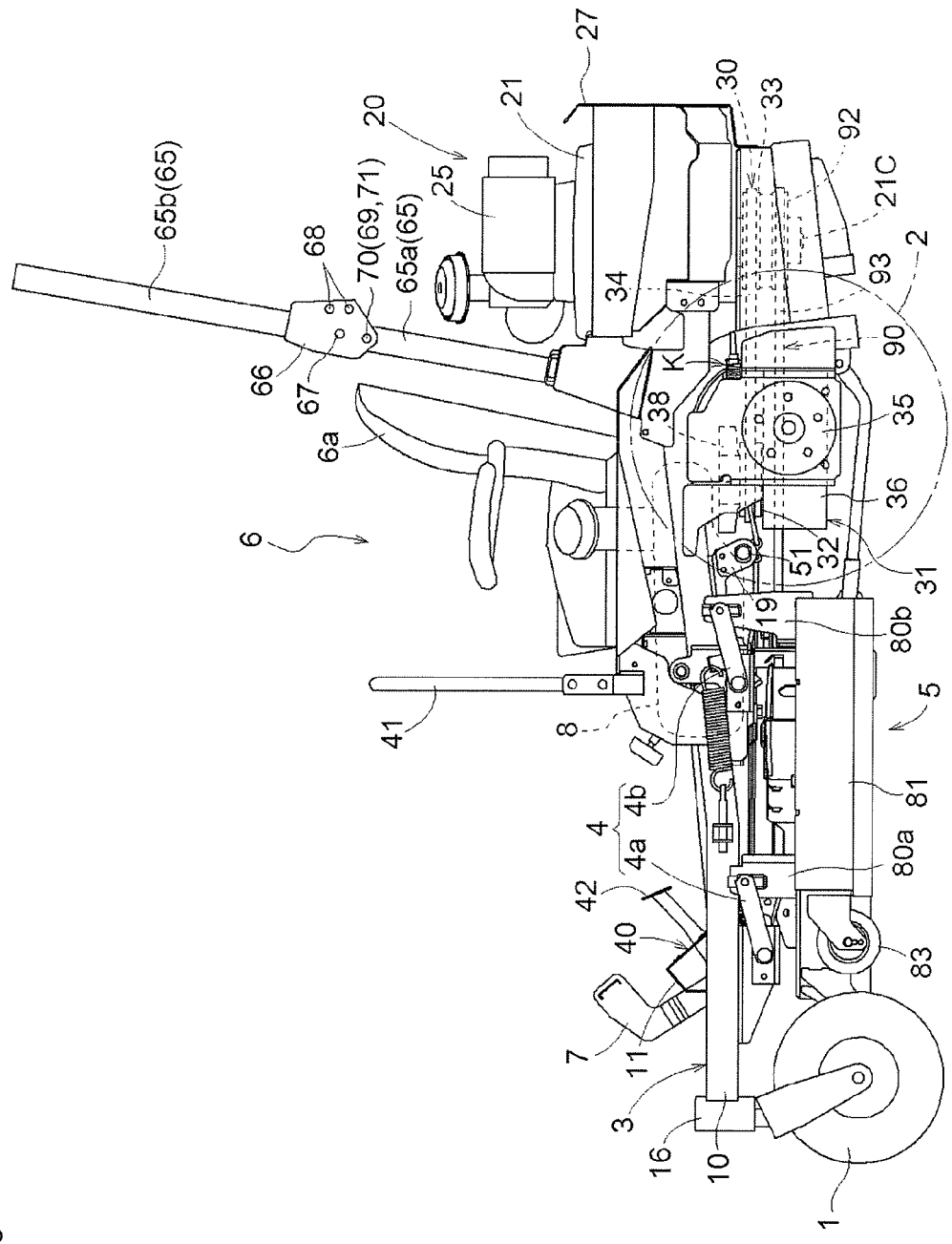
FIG. 1 is a side view illustrating an entirety of a riding type mower.
Figure 2:
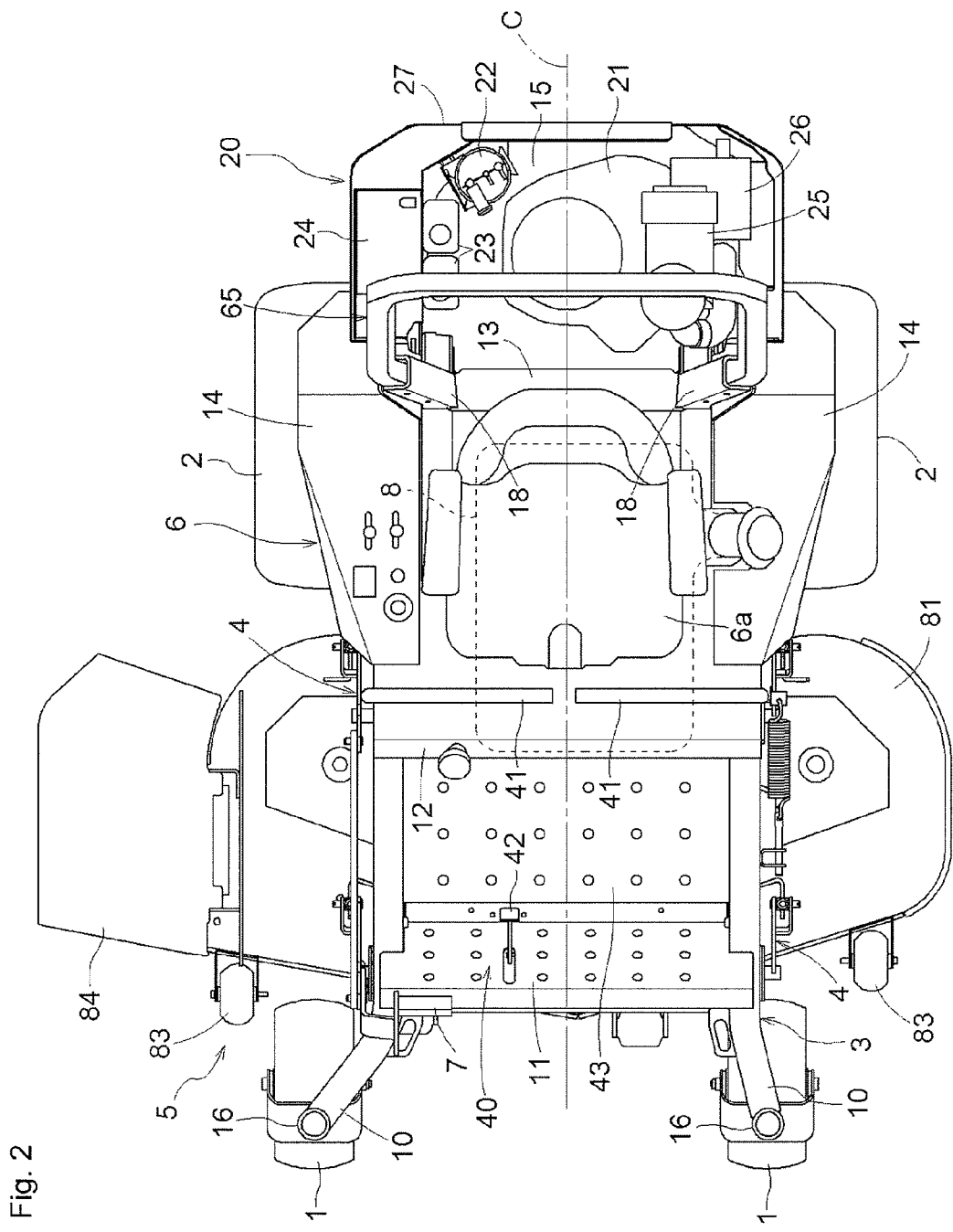
FIG. 2 is a plan view illustrating an entirety of the riding type mower.

Hereinafter, an embodiment of the present invention is described with reference to the drawings. FIG. 1 is a side view illustrating an entirety of a riding type mower according to the embodiment of the present invention. FIG. 2 is a plan view illustrating the entirety of the riding type mower according to the embodiment of the present invention. As shown in these drawings, the riding type mower of the embodiment of the present invention is configured with a self-propelled vehicle that drives with a left-right pair of caster-type front wheels 1 and a left-right pair of freely drivable rear wheels 2. The riding type mower is further configured with a mowing apparatus 5 arranged between the front wheels 1 and the rear wheels 2 of the self-propelled vehicle and connected by a link mechanism 4 to a vehicle body frame 3.

In the riding type mower, by oscillating a pedal type elevating lever 7 provided to a front portion of a driver section 6, the link mechanism 4 is vertically oscillated with respect to the vehicle body frame 3, and accordingly the mowing apparatus 5 is raised and lowered between a raised non-operative position in which a gauge wheel 83 is raised off the ground and a lowered operative position in which the gauge wheel 83 is in contact with the ground. The riding type mower performs mowing work such as lawn mowing with the mowing apparatus 5 by lowering the mowing apparatus 5 to the lowered operative position and driving the self-propelled vehicle.

Figure 3:
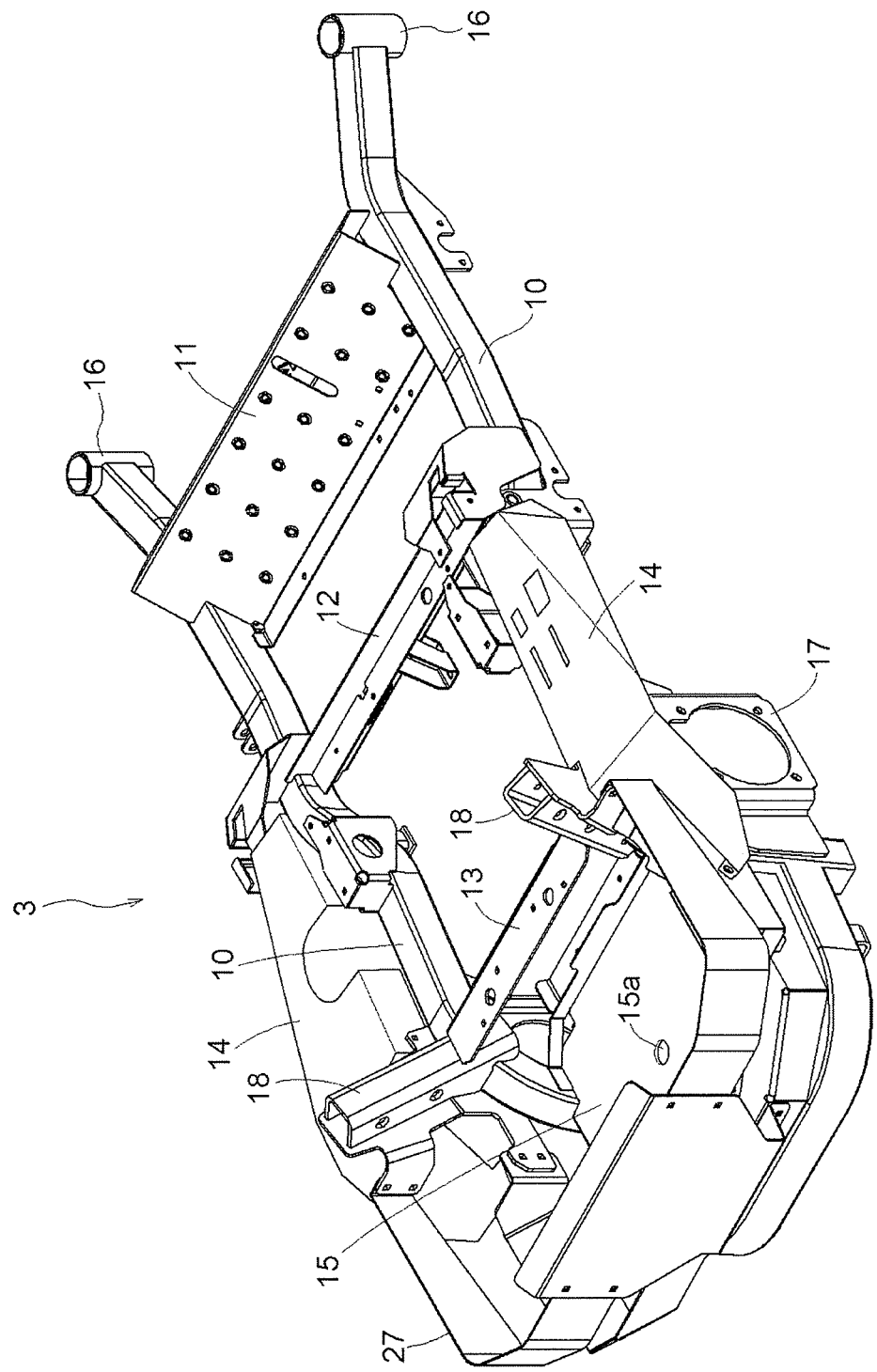
FIG. 3 is a perspective view illustrating a vehicle body frame.

The self-propelled vehicle is now described. FIG. 3 is a perspective view illustrating the vehicle body frame 3 of the self-propelled vehicle. As shown in this drawing, the vehicle body frame 3 of the self-propelled vehicle is configured with a left-right pair of main frames 10, a front driver section frame 11, a middle driver section frame 12, a rear driver section frame 13, plate-like frames 14, and a driving section frame 15. The left-right pair of main frames 10 extends in a front-rear direction of the vehicle body. The front driver section frame 11, the middle driver section frame 12, and the rear driver section frame 13 each connect to the left-right pair of main frames 10 at three positions distributed in the front-rear direction. The plate-like frames 14 connect between a middle portion and a rear end portion of each of the left-right pair of main frames 10. The driving section frame 15 connects a front end portion thereof to rear end portions of the left-right pair of main frames 10.

A front wheel supporter 16 is configured with a tubular member attached to each front end portion of the respective left-right pair of main frames 10, the tubular member being provided in a vertical direction of the vehicle body. The left and right plate-like frames 14 are connected along the main frames 10 between a position at which the middle driver section frame 12 is connected to the main frames 10 and a position at which the rear driver section frame 13 is connected to the main frames 10. Thereby, the main frame 10 is reinforced by the plate-like frames 14. Lateral external sides of the left and right plate-like frames 14 are configured to be rear wheel fenders covering an upper portion of the rear wheels 2. One of the plate-like frames 14 has a guiding groove for an accelerator lever and a clutch lever of an engine 21, thereby configuring a lever guide.

Figure 6:
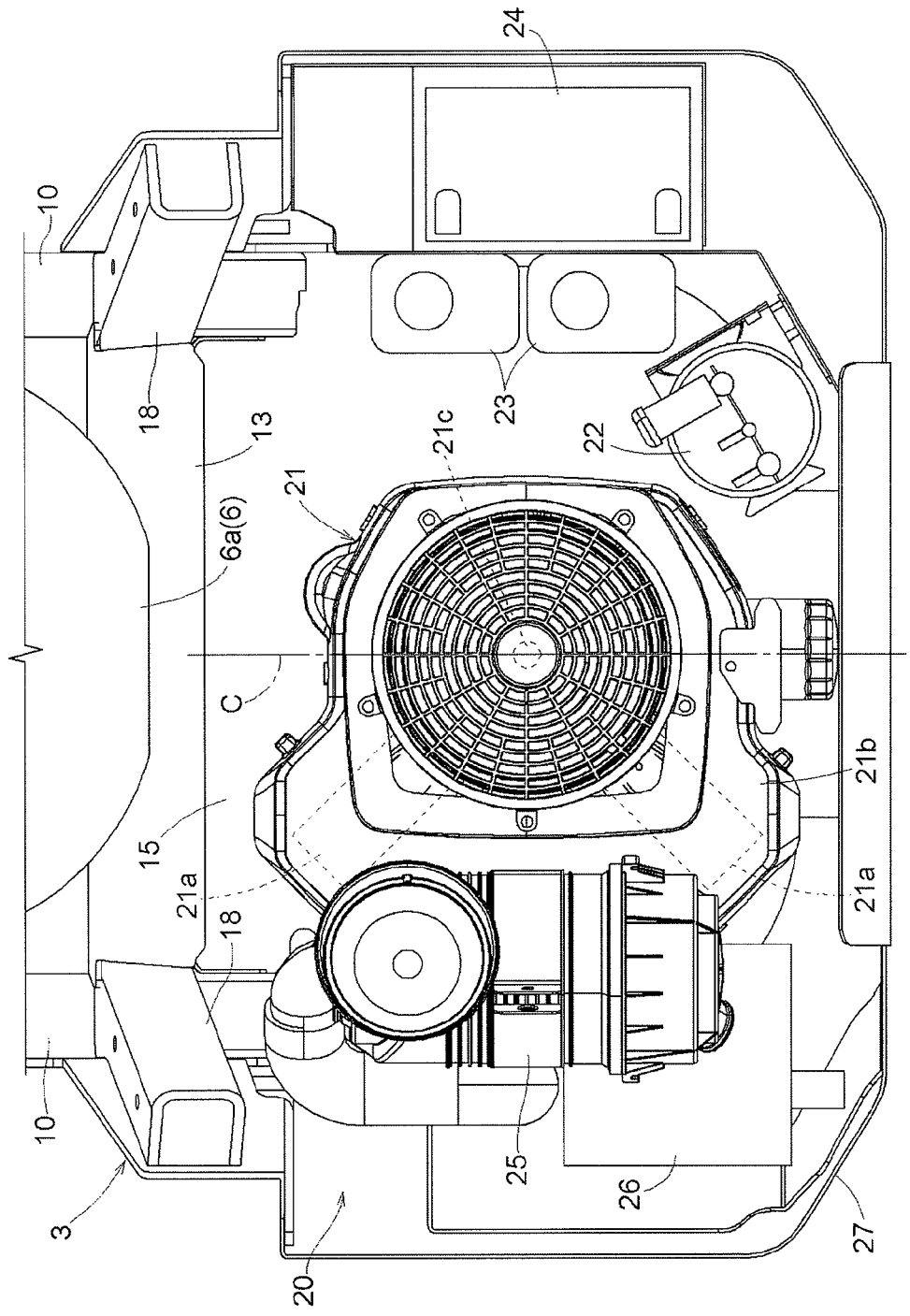
FIG. 6 is a plan view illustrating a driving section.

A driving section 20 equipped with the engine 21 is provided to a rear portion of the self-propelled vehicle. FIG. 6 is a plan view illustrating the driving section 20. As shown in this drawing, the driving section 20 has the engine 21 provided to an upper surface of the driving section frame 15. The driving section 20 further includes a charcoal canister 22, a pair of tanks 23, a battery 24, an air cleaner 25 for an engine, and an exhaust muffler 26, all of which are separately provided on either lateral side of the engine 21. The driving section 20 further includes a guard 27 having a U-shape from a plan view, the guard 27 being provided to an upper portion of the driving section frame 15 so as to protect the engine 21 and its ancillary equipment such as the charcoal canister 22, the exhaust muffler 26, and the like.

Figure 4:
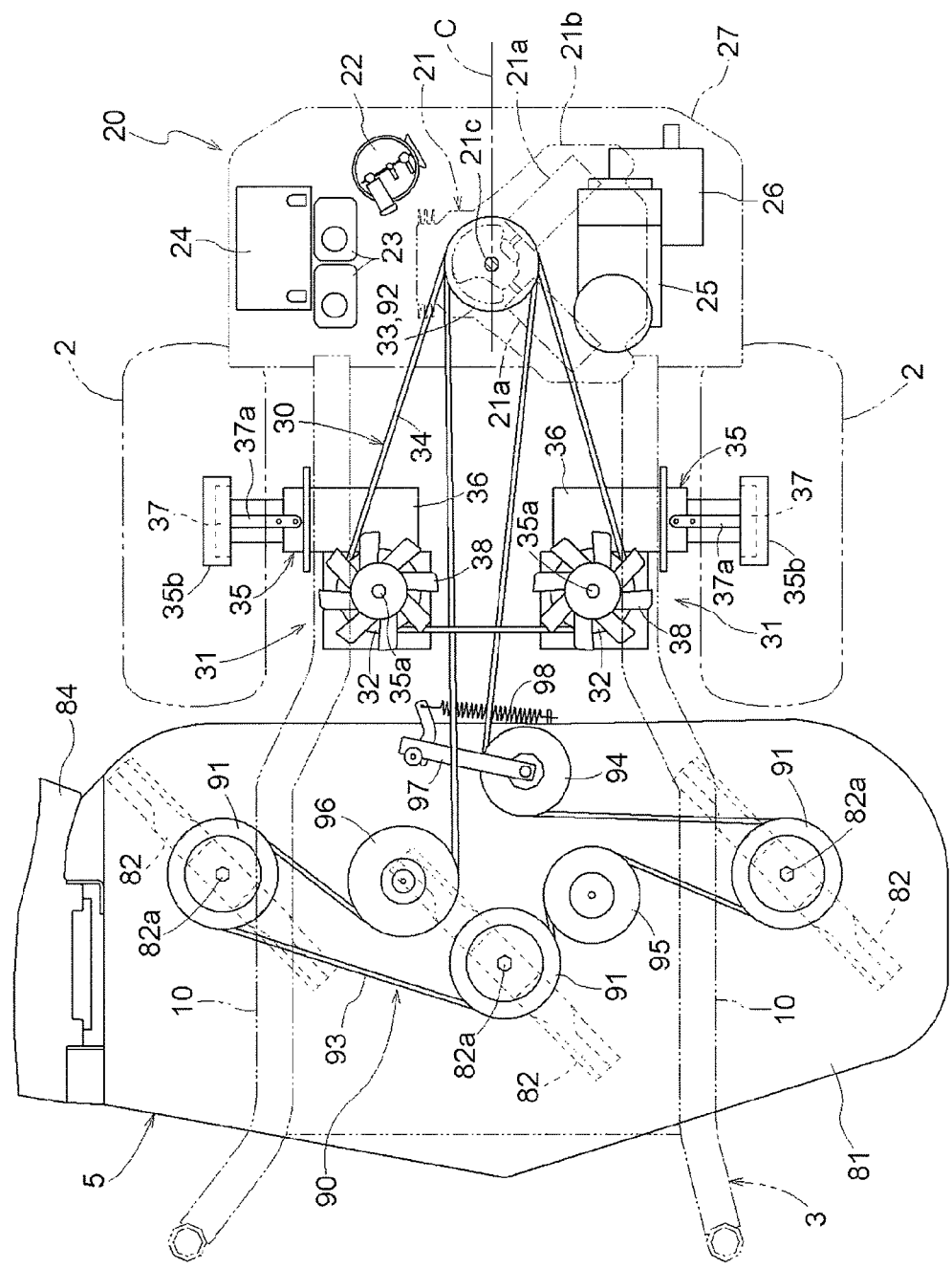
FIG. 4 is a plan view illustrating a propelling drive apparatus and an operation drive apparatus.
Figure 5:
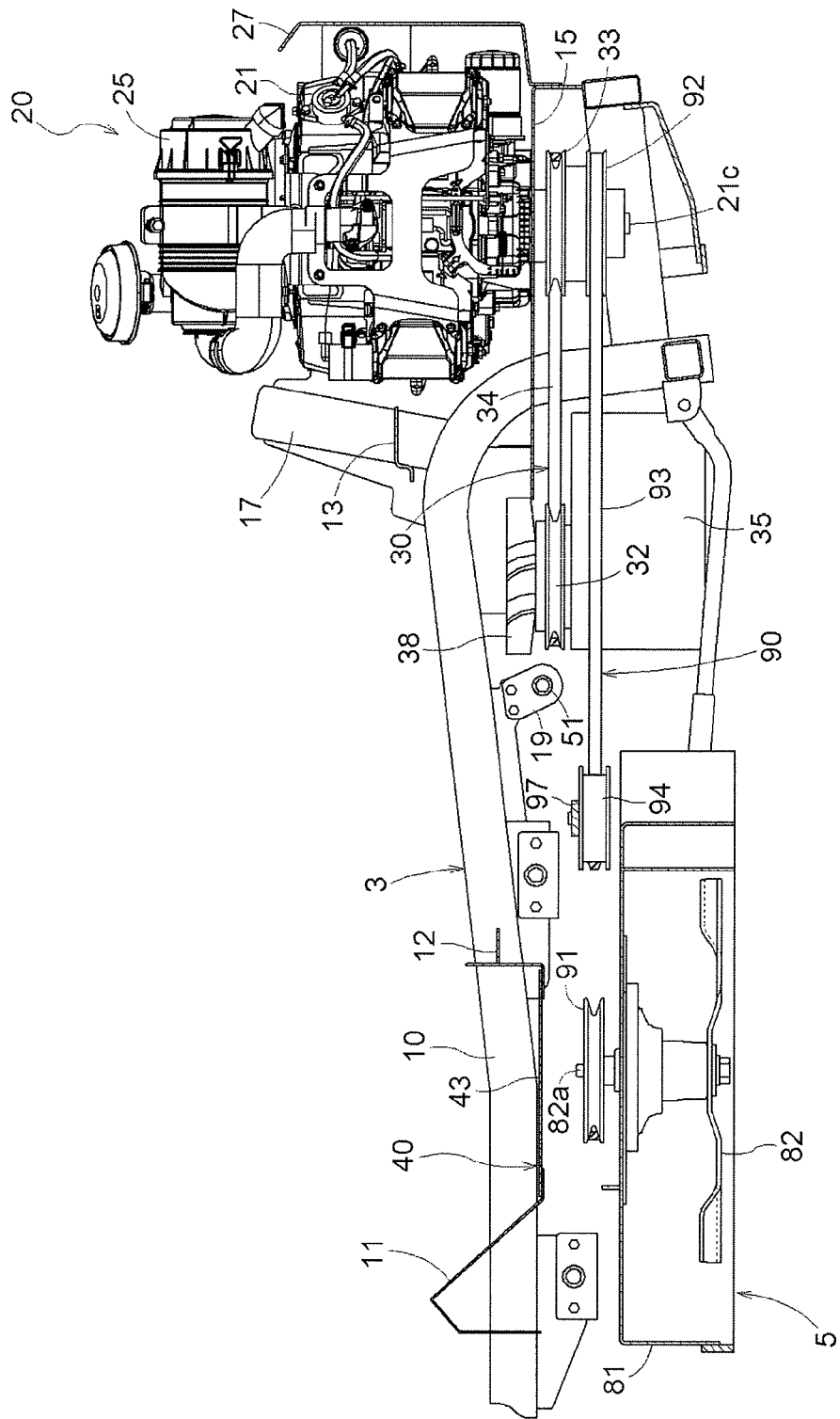
FIG. 5 is a side view illustrating the propelling drive apparatus and the operation drive apparatus.

As shown in FIGS. 4 to 6, the engine 21 includes an engine main body 21*b* and an output shaft 21*c*. A pair of cylinders 21*a* is horizontally provided to the engine main body 21*b* so as to form a V-shape. The output shaft 21*c* extends from the engine main body 21*b* to a downward direction of the vehicle body. The engine 21 is a gasoline engine as well as an air-cooled engine. The engine 21 is arranged such that the output shaft 21*c* is positioned at a left-right direction center C of the vehicle body; two cylinders 21*a* are arranged on the left side of the vehicle body with respect to the left-right direction center C; and the output shaft 21*c* projects downward from the driving section frame 15 via a through hole 15*a* provided to the driving section frame 15.

Lateral sides of the driving section 20 are divided into a left-right pair of spaces at the left-right direction center C as a boundary. The charcoal canister 22, the two tanks 23, and the battery 24 are located on a lateral side of the vehicle body with respect to the engine 21, the side being opposite across the left-right direction center C to a side where the cylinders 21*a* are positioned and in the lateral space of the driving section 20 which accommodates a region opposite across the output shaft 21*c* of the engine main body 21*b* to a side where the cylinders 21*a* are positioned. More specifically, the charcoal canister 22, the two tanks 23, and the battery 24 are provided on the right side of the vehicle body with respect to the engine 21. The charcoal canister 22 absorbs and stores gasoline vapor generated in a fuel tank 8 (see FIGS. 1 and 2) using an activated charcoal. The charcoal canister 22 is connected to the fuel tank 8 and the engine 21 so that, when the engine 21 starts, the stored gasoline vapor is provided to an aspiration system of the engine 21 so as to be burnt. The fuel tank 8 is provided at the left-right direction center of the vehicle body below a driver's seat 6*a* so that left-right and front-rear weight balance of the vehicle is less likely to be changed even when stored fuel is decreased.

The two tanks 23 are provided on the right side of the vehicle body with respect to the engine 21 so as to be laterally positioned with respect to the engine 21 on the side where the charcoal canister 22 is positioned. In addition, the two tanks 23 are provided so as to line up in the front-rear direction of the vehicle body with respect to the charcoal canister 22. More specifically, the two tanks 23 are positioned on the front side of the vehicle body with respect to the charcoal canister 22. The two tanks 23 store lubricating oil to be supplied to rear wheel drive apparatuses 31 (described later). The battery 24 is provided on a lateral side of the tanks 23, the side being opposite to a side where the engine 21 is provided.

On the lateral sides of the driving section, there are a left-right pair of spaces that is divided into left and right at the left-right direction center C of the vehicle body. The air cleaner 25 and the exhaust muffler 26 are provided in one of the left-right pair of spaces beside the driving section 20 on the side where the cylinders 21*a* are positioned. The charcoal canister 22 of the engine 21 is positioned in the other space on the opposite side of the vehicle body with respect to the output shaft 21*c* of the engine main body 21*b*. More specifically, the air cleaner 25 and the exhaust muffler 26 are provided on the left side of the vehicle body with respect to the engine 21. The air cleaner 25 and the exhaust muffler 26 are arranged in the vertical direction of the vehicle body. More specifically, the exhaust muffler 26 is positioned below the air cleaner 25. The air cleaner 25 is positioned on an upper lateral position with respect to the engine 21.

FIG. 4 is a plan view illustrating a propelling drive apparatus 30 driving the left-right pair of rear wheels 2 using drive force from the engine 21. FIG. 5 is a side view illustrating the propelling drive apparatus 30 driving the left-right pair of rear wheels 2 using drive force from the engine 21. As shown in these drawings, the propelling drive apparatus 30 includes the left-right pair of rear wheel drive apparatuses 31 and a drive transmission belt 34. The left-right pair of rear wheel drive apparatuses 31 supports the left-right pair of rear wheels 2 so as to separately drive each of the wheels. The drive transmission belt 34 wraps around input pulleys 32 provided to each of the left-right pair of rear wheel drive apparatuses 31 and around an output pulley 33 integrally and rotatably provided to the output shaft 21*c* of the engine 21. The left-right pair of rear wheel drive apparatuses 31 is provided on the front side of the vehicle body with respect to the engine 21 and on the rear side of the vehicle body with respect to the driver step 40. Each of the left-right pair of rear wheel drive apparatuses 31 is separately supported by each of a left-right pair of supporters 17 (see FIG. 3) provided to the vehicle body frame 3.

Specifically, the propelling drive apparatus 30 transmits drive force that the engine 21 outputs from the output shaft 21*c* to the input pulley 32 of the left rear wheel drive apparatus 31 using the drive transmission belt 34. The left rear wheel drive apparatus 31 then transmits the drive force to the left rear wheel 2. The propelling drive apparatus 30 further transmits the drive force that the engine 21 outputs from the output shaft 21c to the input pulley 32 of the right rear wheel drive apparatus 31 using the drive transmission belt 34. The right rear wheel drive apparatus 31 then transmits the drive force to the right rear wheel 2.

Each of the left-right pair of rear wheel drive apparatuses 31 is rotatably provided at one end thereof with an input shaft 35a to which the input pulley 32 is integrally and rotatably connected. At the other end thereof, the left-right pair of rear wheel drive apparatuses 31 is provided with a driving case 35 and a hydrostatic transmission 36, the driving case 35 being rotatably provided with a rear wheel supporter 35b and the hydrostatic transmission 36 being housed in the driving case 35.

Specifically, the left-right pair of rear wheel drive apparatuses 31 transforms the drive force transmitted from the engine 21 to the input pulley 32 into forward drive force and reverse drive force using the hydrostatic transmission 36. In addition, the speed of the forward drive force and the reverse drive force is steplessly shifted and transferred to the rear wheel 2.

The left-right pair of rear wheel drive apparatuses 31 includes a rear wheel brake 37 provided at a position where the rear wheel supporter 35b of the driving case 35 is located. Each rear wheel brake 37 for each of the left-right pair of rear wheel drive apparatuses 31 is turned on and off by a lever-type operation portion 37a provided above the driving case 35. Each rear wheel brake 37 for each of the left-right pair of rear wheel drive apparatuses 31 is configured with a dram brake that works on the rear wheel supporter 35b.

Each input pulley 32 of each of the left-right pair of rear wheel drive apparatuses 31 is provided on an upper surface side of the driving case 35 and on the internal side in the lateral direction of the vehicle body with respect to the operation portion 37a of the rear wheel brake 37. Each input shaft 35a of each of the left-right pair of rear wheel drive apparatuses 31 is integrally and rotatably provided with a cooling fan 38 arranged above the input pulley 32.

The self-propelled vehicle includes the driver section 6 equipped with the driver step 40 provided at the front portion of the vehicle body. As shown in FIGS. 1 and 2, in addition to the driver step 40, the driver section 6 further includes the driver's seat 6a, a left-right pair of control levers 41, and a brake pedal 42. The driver's seat 6a is provided on upper rear side of the driver step 40. The left-right pair of control levers 41 is separately provided on both the lateral sides of the driver's seat 6a. The brake pedal 42 is provided on the front end side of the driver step 40.

The driver step 40 is configured with a front driver section frame 11 and a main driver step 43. The front driver section frame 11 connects to the left-right pair of main frames 10. The main driver step 43 is provided between the front driver section frame 11 and the middle driver section frame 12 and is supported by the left-right pair of main frames 10.

The left-right pair of control levers 41 is each coupled with respective operation portions of the hydrostatic transmissions 36 provided to the left-right pair of rear wheel drive apparatuses 31.

Specifically, by oscillating the left-right pair of control levers 41 in the front-rear direction of the vehicle body, the speed of each hydrostatic transmission 36 of the respective left-right pair of rear wheel drive apparatuses 31 can be separately shifted. Accordingly, the left-right pair of rear wheels 2 is driven at the same driving speed in a forward direction and a rear direction, thereby making it possible to drive the self-propelled vehicle straight forward and straight backward. When the left-right pair of rear wheels 2 is driven by the left-right pair of hydrostatic transmissions 36 in different directions or at different driving speed in a forward direction and a rear direction, it is possible to drive the self-propelled vehicle in a circle.

The brake pedal 42 is coupled with the operation portions 37a of the rear wheel brakes 37 provided to the left-right pair of rear wheel drive apparatuses 31.

Figure 7:
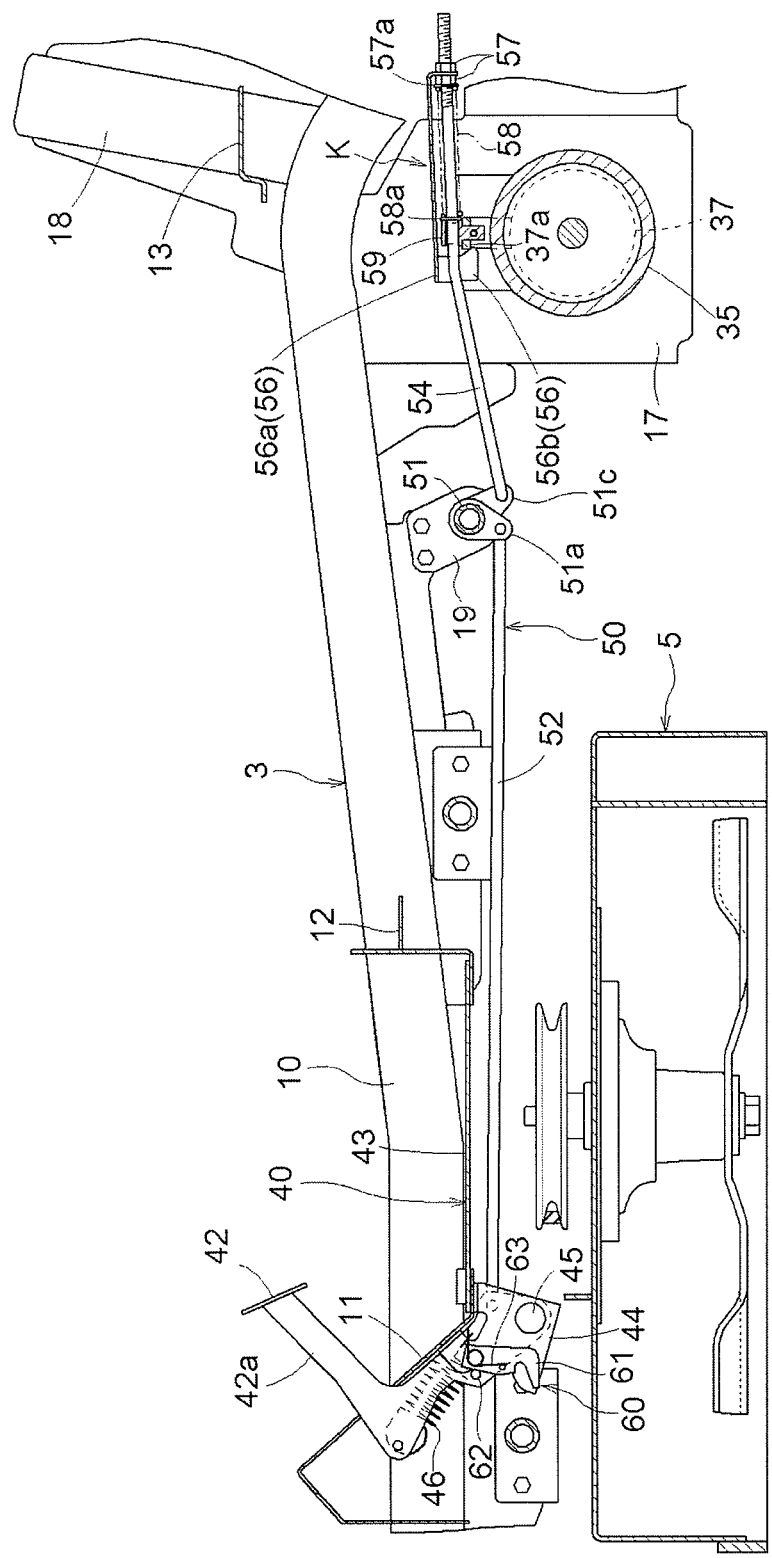
FIG. 7 is a side view illustrating a coupling mechanism.
Figure 8:
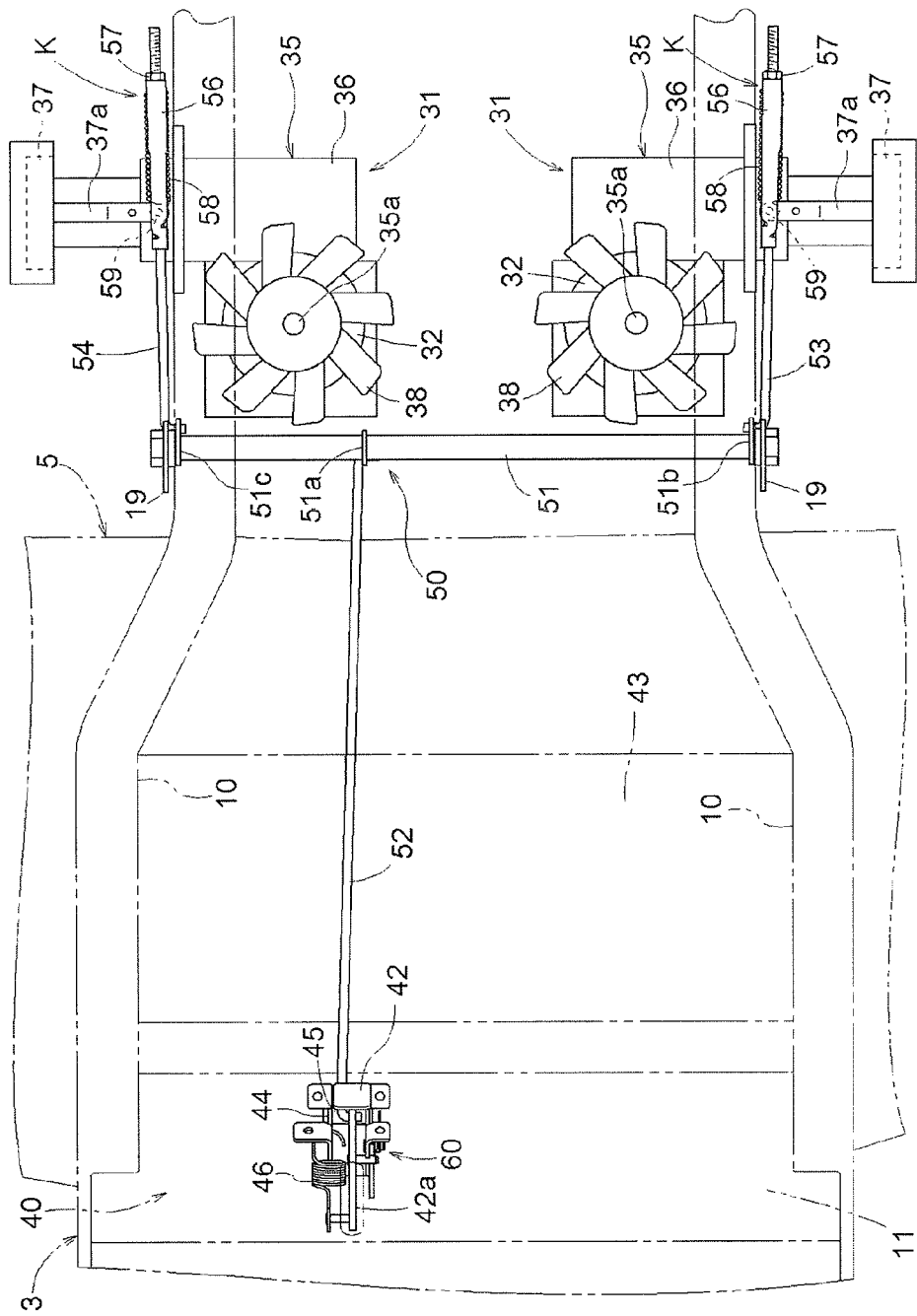
FIG. 8 is a plan view illustrating the coupling mechanism.
Figure 9:
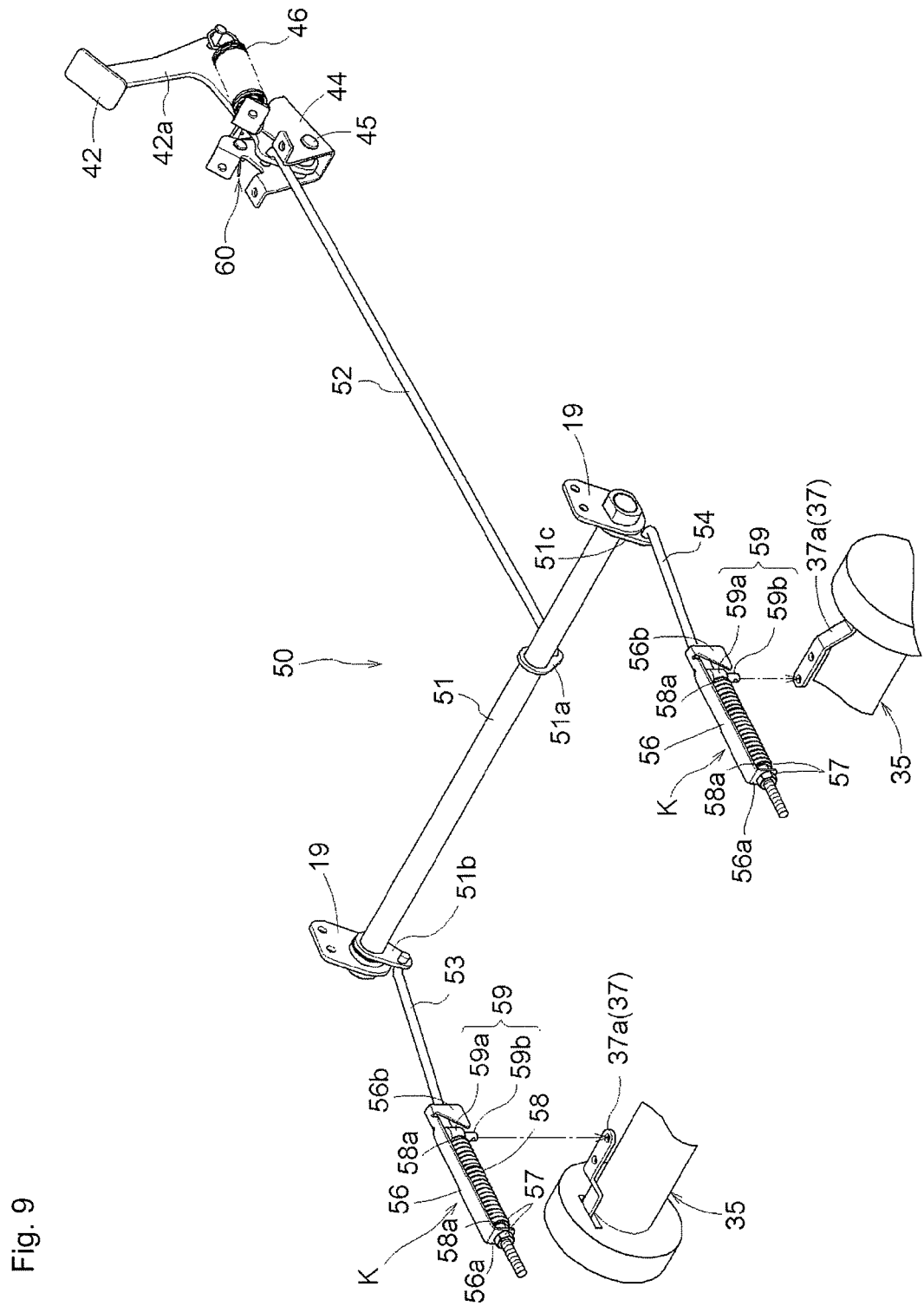
FIG. 9 is a perspective view illustrating the coupling mechanism.

FIG. 7 is a side view illustrating a coupling mechanism 50 that couples the brake pedal 42 with the operation portions 37a of the left-right pair of rear wheel brakes 37. FIG. 8 is a plan view illustrating the coupling mechanism 50 that couples the brake pedal 42 with the operation portions 37a of the left-right pair of rear wheel brakes 37. FIG. 9 is a perspective view illustrating the coupling mechanism 50 that couples the brake pedal 42 with the operation portions 37a of the left-right pair of rear wheel brakes 37. As shown in these drawings and FIG. 1, the coupling mechanism 50 is configured with a relay shaft 51, a pedal coupling rod 52, a left brake coupling rod 53, and a right brake coupling rod 54. The relay shaft 51 is rotatably provided in the lateral direction of the vehicle body on the rear side of the mowing apparatus 5 and on the front side of the left-right pair of rear wheel drive apparatuses 31. The pedal coupling rod 52 extends in the front-rear direction of the vehicle body and connects to an arm 51a and to an arm 42a of the brake pedal 42, the arm 51a being integrally and rotatably provided to a middle portion of the relay shaft 51. The left brake coupling rod 53 extends in the front-back direction of the vehicle body and connects to an arm 51b and to the operation portion 37a of the left rear wheel brake 37, the arm 51b being integrally and rotatably provided to the left end of the relay shaft 51. The right brake coupling rod 54 connects to an arm 51c and to the operation portion 37a of the right rear wheel brake 37, the arm 51c being integrally and rotatably provided to the right end of the relay shaft 51.

The pedal coupling rod 52 extends above the mowing apparatus 5 in the front-rear direction of vehicle body. The left brake coupling rod 53 and the right brake coupling rod 54 extend in the front-rear direction of vehicle body on the lateral outer side of the vehicle body with respect to the input pulley 32 of the rear wheel drive apparatuses 31 below the main frames 10.

As shown in FIGS. 7, 10A to 10C, and 11, the brake pedal 42 is oscillatably and pivotingly supported by a supporting body 44 via a pivot 45, the supporting body 44 being fixed over the reverse side of the main driver step 43 and the reverse side of the front driver section frame 11. As shown in FIGS. 7 and 8, the relay shaft 51 is rotatably supported by a left-right pair of supporters 19 provided to the left-right pair of main frames 10.

Figure 12:
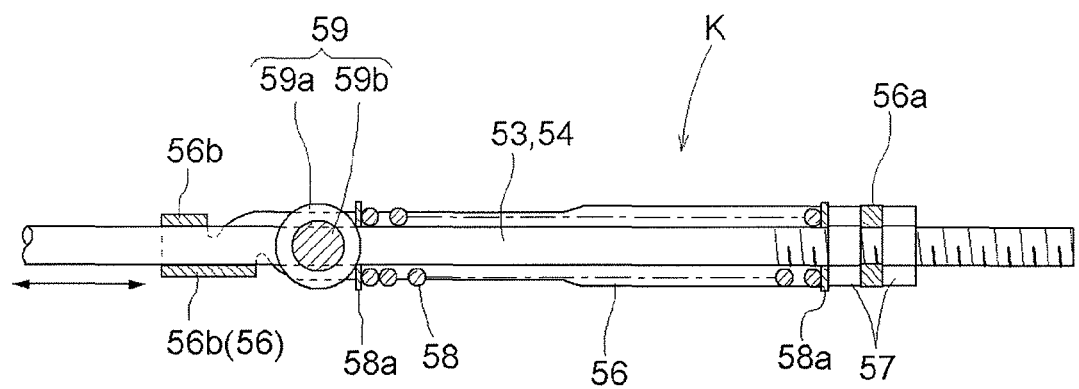
FIG. 12 is a bottom view illustrating a connecting mechanism.

FIG. 12 is a bottom view illustrating a connector K connecting the operation portions 37a of the rear wheel brakes 37 to the left brake coupling rod 53 and the right brake coupling rod 54. Herein, the left brake coupling rod 53 and the right brake coupling rod 54 are simply referred to as the coupling rods 53 and 54 in the description. As shown in FIGS. 9 and 12, each connector K is configured with an operation member 56, an operation spring 58, and a coupling pin 59. The operation member 56 is configured with a connecting piece 56a fixed by pair of screws 57 to the respective rear end portion of the coupling rods 53 and 54. The operation spring 58 and the coupling pin 59 are fitted on the coupling rods 53 and 54 and are provided between the connecting piece 56a and a two-pronged swing stopper 56b provided at an end portion opposite to the end where the connecting piece 56a of the operation member 56 is located. The coupling pin 59 is configured with a large diameter portion 59a and a small diameter pin 59b. The large diameter portion 59a is slidably fitted on the coupling rods 53 and 54. The small diameter pin 59b extends from the large diameter portion 59a, and an extending end of the small diameter pin 59b is engageably inserted to a pin hole of the operation portion 37a of the rear wheel brake 37.

Accordingly, in the connectors K, when the brake pedal 42 is pushed down to a braking position and the coupling rods 53 and 54 are shifted toward the front side of the vehicle body, the operation members 56 are shifted toward the front side of the vehicle body by the coupling rods 53 and 54. The connecting pieces 56a of the operation members 56 then shift the operation springs 58 toward the front side of the vehicle body via the screws 57 and spring bearing plates 58a. The operation springs 58 contact the large diameter portions 59a of the coupling pins 59 from the rear side of the vehicle body via the spring bearing plates 58a and shift the coupling pins 59 toward the front side of the vehicle body. The coupling pins 59 shift the operation portions 37a to the braking position.

In the connector K, when the brake pedal 42 is returned to a braking-off position by a return spring 46 and the coupling rods 53 and 54 are shifted toward the rear side of the vehicle body, the operation members 56 are shifted toward the rear side of the vehicle body by the coupling rods 53 and 54. The connecting pieces 56a of the operation members 56 then shift toward the rear side of the vehicle body, which allows the operation springs 58 and the coupling pins 59 to shift toward the rear side of the vehicle body by a recovering force of the rear wheel brakes 37 to a braking-off side. Accordingly, the operation portions 37a are shifted to the braking-off position.

Specifically, when the brake pedal 42 is operated and pushed down, force from the operation is transferred to the relay shaft 51 by the pedal coupling rod 52. The relay shaft 51 then divides the operation force into left operation force and right operation force. The left operation force is transferred to the operation portion 37a of the left rear wheel brake 37 by the left brake coupling rod 53 and the connector K so that the left rear wheel brake 37 is switched to a braking state. The right operation force is transferred to the operation portion 37a of the right rear wheel brake 37 by the right brake coupling rod 54 and the connector K so that the right rear wheel brake 37 is switched to a braking state. At this time, a locking mechanism 60 (see FIGS. 10A to 11) provided on a base side of the arm 42a of the brake pedal 42 is automatically applied. The brake pedal 42 is thus fixed in a pushed-down state by a hook 61 of the locking mechanism 60 against the return spring 46. Accordingly, a left-right pair of rear wheel brakes 37 are kept in the braking state.

Accordingly, by pushing down the brake pedal 42, the left-right pair of rear wheel brakes 37 is switched to and kept in the braking state. Thereby, a parking brake is applied to the self-propelled vehicle.

Figure 10A:
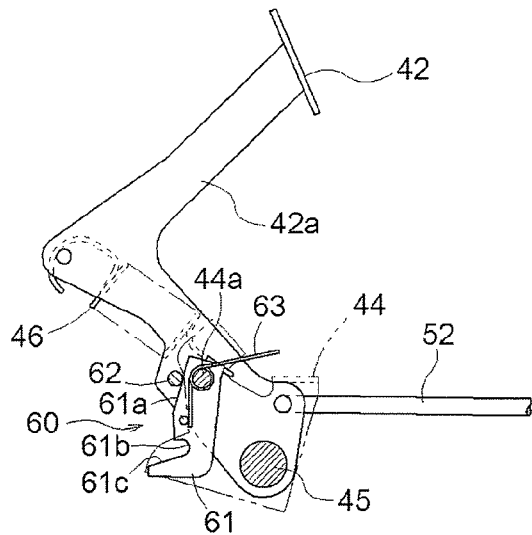
FIG. 10A is a side view illustrating a locking mechanism in a state where a brake pedal is operated to be in a braking-off position.
Figure 10B:
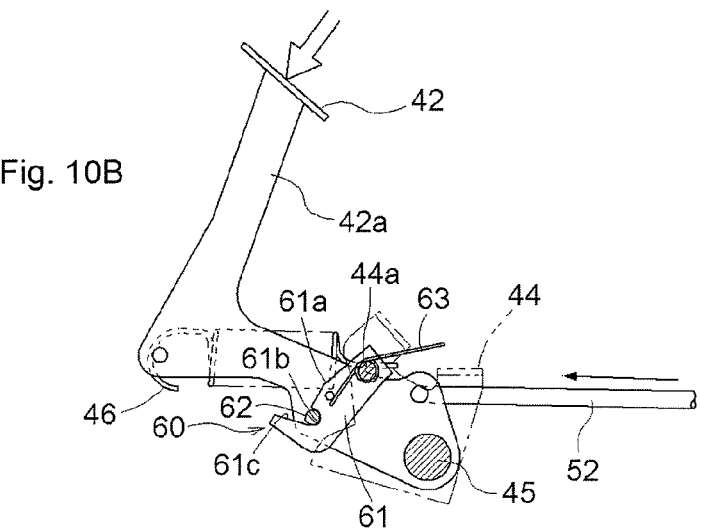
FIG. 10B is a side view illustrating the locking mechanism in a state where the brake pedal is operated to be in a braking position.
Figure 10C:
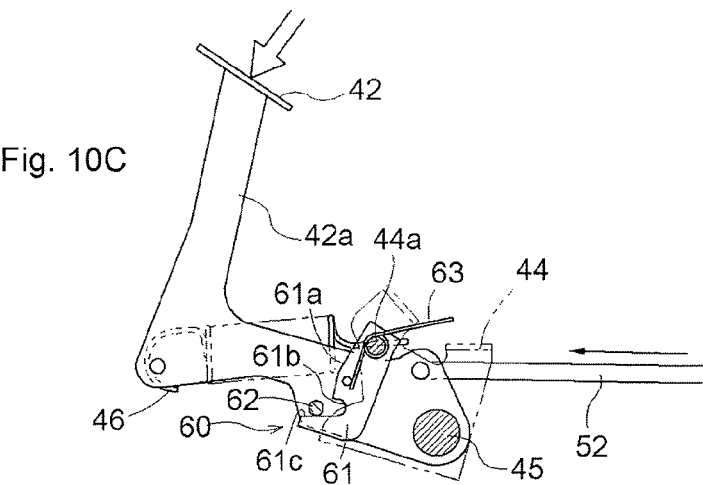
FIG. 10C is a side view illustrating the locking mechanism in a state where the brake pedal is further pushed in from the braking position.
Figure 11:
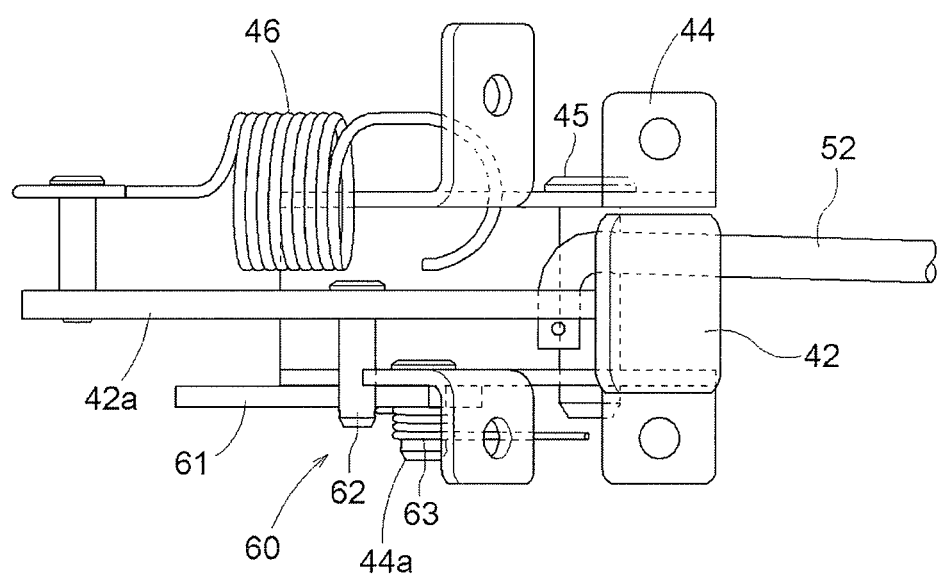
FIG. 11 is a plan view illustrating a supporting mechanism of the brake pedal.

As shown in FIGS. 10A to 11, the locking mechanism 60 is configured with the hook 61, a lock pin 62, and a lock spring 63. The hook 61 is oscillatably supported by the supporting body 44 via a pivot 44a. The lock pin 62 is provided to the base of the arm 42a of the brake pedal 42. The lock spring 63 rockingly urges the hook 61 such that the hook 61 engages with the lock pin 62.

FIG. 10A is a side view illustrating the locking mechanism 60 in a state where the brake pedal 42 is returned to the braking-off position. FIG. 10B is a side view illustrating the locking mechanism 60 in a state where the brake pedal 42 is pushed down to the braking position. FIG. 10C a side view illustrating the locking mechanism 60 in a state where the brake pedal 42 is further pushed down from the braking position.

As shown in FIGS. 10 A and 10B, in the locking mechanism 60, when the brake pedal 42 is pushed down from the braking-off position to the braking position, the lock pin 62 slides and applies pressure on a first releasing cam 61a provided to the hook 61 so that the hook 61 is kept on a released side against the lock spring 63. Accordingly, the locking mechanism 60 is released, thereby allowing the brake pedal 42 to be pushed in.

As shown in FIG. 10B, in the locking mechanism 60, when the brake pedal 42 is pushed down to the braking position, the lock pin 62 opposes a pin engaging concave portion 61b of the hook 61 and the lock spring 63 rockingly urges the hook 61 so that the hook 61 engages with the lock pin 62. Thereby, the locking mechanism 60 is switched to a locked state and fixes the brake pedal 42 in the braking position.

As shown in FIG. 10C, in the locking mechanism 60, when the brake pedal 42 is further pushed down from the braking position, the lock pin 62 applies pressure on a second releasing cam 61c provided to the hook 61 so that the hook 61 is rockingly shifted to a release side against the lock spring 63. Accordingly, the locking mechanism 60 is switched to a lock-released state, thereby allowing the brake pedal 42 to return to the braking-off position by the return spring 46. In this case, the operation spring 58 deforms and thereby allows the left brake coupling rod 53 and the right brake coupling rod 54 to shift to the front side of the vehicle body with respect to the operation portions 37a of the rear wheel brakes 37 in the braking position.

A roll guard frame 65 is provided on the rear side with respect to the driver's seat 6a of the self-propelled vehicle. As shown in FIGS. 1 and 2, the roll guard frame 65 is configured with a left-right pair of lower frames 65a and an upper frame 65b. The left-right pair of lower frames 65a extends upward from the vehicle body frame 3. The upper frame 65b extends from the upper ends of the left-right pair of lower frames 65a and has a gate-like shape when viewed in the front-rear direction of the vehicle body. A lower end side of the lower frame 65a is fitted in and connected to tube-like supporters 18 that are vertically provided to the main frames 10 as shown in FIG. 3. The left-right pair of lower frames 65a is thus connected to the vehicle body frame 3. The supporters 18 are also connected to and supported by a rear end side of the plate-like frames 14 and an end of the guard 27.

The upper frame 65b is pivotingly supported by the upper ends of the left-right pair of lower frames 65a via a connection pivot 67 at a connector 66 having sheet metal members provided to both the ends thereof. By being oscillated in the front-rear direction of the vehicle body pivoting around the connection pivot 67, the upper frame 65b switches between a standing-for-use posture in which the upper frame 65b stands on the left-right pair of lower frames 65a and a reclining-for-storage posture in which the upper frame 65b is reclined toward the rear side of the vehicle body with respect to the left-right pair of lower frames 65a.

Figure 13A:
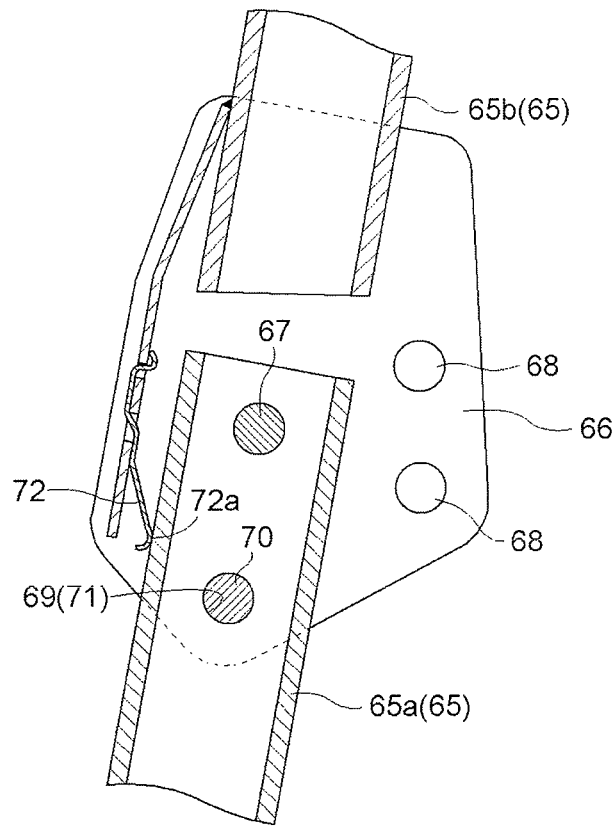
FIG. 13A is a side view illustrating a mechanism that fixes an upper frame in a standing posture.
Figure 13B:
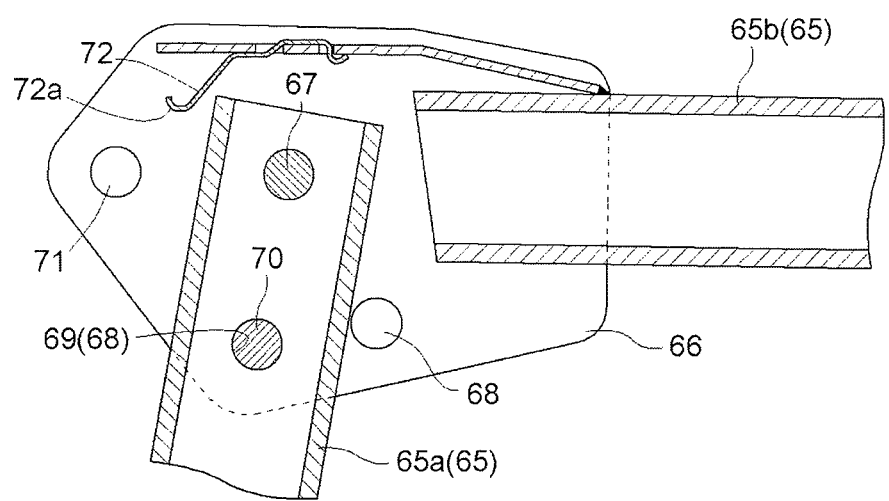
FIG. 13B is a side view illustrating a mechanism that fixes the upper frame in a reclining-for-storage posture.

FIG. 13B is a side view illustrating a mechanism fixing the upper frame 65b in the reclining-for-storage posture. As shown in this drawing, when the upper frame 65b is switched to the reclining-for-storage posture, a lock pin 70 is inserted to one of a pair of pin holes 68 serving as a reclining lock provided to the connector 66 and to a pin hole 69 provided to the lower frame 65a. Thereby, the upper frame 65b is fixed in the reclining-for-storage posture.

FIG. 13A is a side view illustrating a mechanism fixing the upper frame 65b in the standing-for-use posture. As shown in this drawing, when the upper frame 65b is switched to the standing-for-use posture, the lock pin 70 is removed from the pin hole 68 serving as the reclining lock and is inserted to a pin hole 71 serving as a standing lock provided to the connector 66 and to the pin hole 69 of the lower frame 65a. Thereby, the upper frame 65b is fixed in the standing-for-use posture.

As shown in FIG. 13A, a positioning spring 72 is provided on an internal side of the connector 66, the positioning spring 72 being supported with one side thereof. Providing the positioning spring 72 enables an easy insertion of the lock pin 70 to the pin hole 71 serving as the standing lock and to the pin hole 69.

Specifically, when the upper frame 65b is locked in the standing-for-use posture, a movable end 72a of the positioning spring 72 supports the upper frame 65b, which is raised by oscillation operation, such that the movable end 72a abuts at the upper ends of the lower frames 65a from the front side. Accordingly, the pin hole 71 as the standing lock is matched with the pin hole 69 of the upper frame 65b by a positioning function of the positioning spring 72. Further, the upper frames 65b push the lower frames 65a via the positioning spring 72. The upper frame 65b is thus stably kept in the standing position where the pin hole 71 and the pin hole 69 are aligned. Thereby, the lock pin 70 can be easily inserted into the pin hole 71 and the pin hole 69.

The mowing apparatus 5 is now described. As shown in FIGS. 1 and 2, the mowing apparatus 5 is provided under the driver step 40 of the self-propelled vehicle and on the front side of the vehicle body with respect to the left-right pair of rear wheel drive apparatuses 31.

As shown in FIGS. 1 and 4, the mowing apparatus 5 is configured with a cutting blade housing 81 and three blade-shaped cutting blades 82. The front end of the cutting blade housing 81 is connected to a left-right pair of front oscillating links 4a via connecting members 80a, the left-right pair of front oscillating links 4a configuring the link mechanism 4. The rear end of the cutting blade housing 81 is connected to a left-right pair of rear oscillating links 4b via connecting members 80b, the left-right pair of rear oscillating links 4b configuring the link mechanism 4. The three cutting blades 82 are lined up in a lateral direction of the vehicle body inside the cutting blade housing 81 and are capable of rotatably driving around vertically provided axes. A gauge wheel 83 is provided to the cutting blade housing 81 at an outer peripheral side of the front end thereof.

Specifically, when the mowing apparatus 5 is lowered to the lowered operative position, the mowing apparatus 5 performs a mowing work with the three cutting blades 82 rotatably driven by drive force from the engine 21. Cut grass is conveyed through the interior of the cutting blade housing 81 to an exhaust opening positioned at a lateral end of the cutting blade housing 81 by a flow of conveying air generated by the rotation of the cutting blades 82. The cut grass is guided by an exhaust guide 84 and is expelled from the exhaust opening to a lateral exterior.

FIG. 4 is a plan view illustrating an operation drive apparatus 90 driving the mowing apparatus 5 with the drive force from the engine 21. FIG. 5 is a side view illustrating the operation drive apparatus 90 driving the mowing apparatus 5 with the drive force from the engine 21. As shown in these drawings, the operation drive apparatus 90 is configured with three cutting blade drive pulleys 91 and a cutting blade transmission belt 93. The three cutting blade drive pulleys 91 are provided on the upper surface side of a top panel of the cutting blade housing 81. The cutting blade transmission belt 93 wraps around the three cutting blade drive pulleys 91 and an output pulley 92, the output pulley 92 being integrally and rotatably provided to the output shaft 21c of the engine 21. The output pulley 92 for the cutting blades is provided to the output shaft 21c of the engine 21 and is provided below the output pulley 33 for propelling.

The three cutting blade drive pulleys 91 are each integrally and rotatably installed in the respective ends of three cutting blade support shafts 82a projecting upward from the cutting blade housing 81. The cutting blade transmission belt 93 above the mowing apparatus 5 wraps around and is supported by the three guiding pulleys 94, 95, and 96 that are rotatably supported by the top panel of the cutting blade housing 81. Between the introductory guiding pulley 94 and the output pulley 92 of the engine 21 and between the output pulley 92 of the engine 21 and the returning guiding pulley 96, the cutting blade transmission belt 93 passes below the drive transmission belt 34 extending between the left-right pair of rear wheel drive apparatuses 31, the relay shaft 51, and the fuel tank 8, the introductory guiding pulley 94 and the returning guiding pulley 96 being among the three guiding pulleys 94, 95, and 96.

A supporting arm 97 of the introductory guiding pulley 94 is rockingly urged by a tension spring 98. Accordingly, the introductory guiding pulley 94 serves as a tension pulley that controls the cutting blade transmission belt 93 with tension.

Other Embodiments (1) The above described embodiment described a configuration example in which the locking mechanism 60 that fixes the brake pedal 42 in the braking position is provided in order to operate the rear wheel brake 37 as a parking brake. However, the present embodiment may be applied to a case where the rear wheel brake 37 is operated as a brake to stop propelling action without the locking mechanism 60.

(2) The above embodiment describes a configuration example in which the drive force of the output shaft 21c of the engine 21 is transferred to the input pulley 32 of the left-right pair of rear wheel drive apparatuses 31 using one drive transmission belt 34. However, the drive force of the output shaft 21c may be transferred to the input pulley 32 of the left rear wheel drive apparatus 31 and the input pulley 32 of the right rear wheel drive apparatus 31 using separate drive transmission belts.

(3) In the above-described embodiment, the rear wheel drive apparatus 31 includes the hydrostatic transmission 36 so as to turn the self-propelled vehicle due to a difference in driving direction and driving speed of the left-right pair of rear wheels 2. However, the rear wheel drive apparatus 31 may include a clutch for controlling direction so as to turn the self-propelled vehicle by driving and stopping the left-right pair of rear wheels 2.

(4) In the above-described embodiment, the mowing apparatus 5 includes the three cutting blades 82. However, the mowing apparatus 5 may be configured to have two or fewer, or to have four or more cutting blades.

The present invention is also applicable to a riding type mower having a mowing apparatus that performs mowing work with a reel-shaped cutting blade, replacing the mowing apparatus 5 that performs mowing work with a blade-shaped cutting blade.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding type mower including a self-propelled vehicle and a mowing apparatus,
   the self-propelled vehicle having a driver step provided to a front portion of the vehicle body, an engine provided to a rear portion of the vehicle body, a left and right pair of rear wheel drive apparatuses provided on a front side of the vehicle body with respect to the engine and on a rear side of the vehicle body with respect to the driver step and transmitting drive force from the engine to each of a left and right pair of rear wheels, and a left and right pair of rear wheel brakes separately provided to the left and right pair of rear wheel drive apparatuses,
   the mowing apparatus being raisably and lowerably provided on the front side of the vehicle body with respect to the left and right pair of rear wheel drive apparatuses below the driver step,
   the riding type mower comprising:
      a cutting blade housing;
      a plurality of driving cases;
      a plurality of cooling fans;
      a plurality of input pulleys;
      a guiding pulley;
      a propelling output pulley;
      a cutting blade output pulley;
      a cutting blade transmission belt;
      a drive transmission belt;
      a coupling mechanism coupling a brake pedal provided to the driver step with operation portions of the left and right pair of rear wheel brakes,
      the coupling mechanism including:
         a relay shaft;
         a pedal coupling rod;
         a left brake coupling rod; and
         a right brake coupling rod,
      the relay shaft being rotatably provided in a lateral direction of the vehicle on the rear side of the vehicle body with respect to the mowing apparatus and on the front side of the vehicle body with respect to the left and right pair of rear wheel drive apparatuses,
      the pedal coupling rod extending in the front-rear direction of the vehicle body above the mowing apparatus and connecting to the brake pedal and to the relay shaft,
      the left brake coupling rod extending in the front-rear direction of the vehicle body and connecting to a left end of the relay shaft and to the operation portion of the left rear wheel brake, and
      the right brake coupling rod extending in the front-rear direction of the vehicle body and connecting to a right end of the relay shaft and the operation portion of the right rear wheel brake, and wherein:
      the relay shaft is arranged in a longitudinal direction of the riding type mower posteriorly to the cutting blade housing and the guiding pulley, and anteriorly to the plurality of driving cases, the plurality of cooling fans, the plurality of input pulleys, the propelling output pulley, the cutting blade output pulley, and the drive transmission belt, and
      the relay shaft is arranged in a vertical direction of the riding type mower above the cutting blade housing, the cutting blade transmission belt, the guiding pulley, the plurality of driving cases, and the cutting blade output pulley, and below the plurality of cooling fans.

2. The riding type mower according to claim 1, wherein each operation portion of each of the left and right pair of rear wheel brakes is provided above a the driving case of each of the rear wheel drive apparatuses; and
   the drive transmission belt wraps around each input pulley provided to each of the left and right pair of rear wheel drive apparatuses and the output pulley integrally and rotatably provided to an output shaft of the engine, each of the input pulleys being provided on the upper surface side of each driving case on an internal side in the lateral direction of the vehicle body with respect to each operation portion.

3. The riding type mower according to claim 2, wherein the cutting blade transmission belt wraps around cutting blade drive pulleys and the cutting blade output pulley, the cutting blade drive pulleys being provided on an upper surface side of the cutting blade housing of the mowing apparatus, and the output pulley being integrally and rotatably provided to the output shaft of the engine; and
   the cutting blade transmission belt passes below the relay shaft and the drive transmission belt between the left and right pair of rear wheel drive apparatuses.

4. The riding type mower according to claim 1, further comprising a vehicle body frame, wherein the vehicle body frame includes an upwardly sloping portion from a front side to a rear side of the vehicle body, and wherein the relay shaft is arranged in a space formed by the upwardly sloping portion.

5. A riding type mower including a self-propelled vehicle and a mowing apparatus,
   the self-propelled vehicle having a driver step provided to a front portion of the vehicle body, an engine provided to a rear portion of the vehicle body, a left and right pair of rear wheel drive apparatuses provided on a front side of the vehicle body with respect to the engine and on a rear side of the vehicle body with respect to the driver step and transmitting drive force from the engine to each of a left and right pair of rear wheels, and a left and right pair of rear wheel brakes separately provided to the left and right pair of rear wheel drive apparatuses,
   the mowing apparatus being raisably and lowerably provided on the front side of the vehicle body with respect to the left and right pair of rear wheel drive apparatuses below the driver step,
   the riding type mower comprising:
      a vehicle body frame including an upwardly sloping portion from a front side to a rear side of the vehicle body;
      a cutting blade housing;
      a plurality of driving cases;
      a plurality of input pulleys;
      a guiding pulley;
      a propelling output pulley;
      a cutting blade output pulley;
      a cutting blade transmission belt;
      a drive transmission belt;

a coupling mechanism coupling a brake pedal provided to the driver step with operation portions of the left and right pair of rear wheel brakes,
the coupling mechanism including:
a relay shaft;
a pedal coupling rod;
a left brake coupling rod; and
a right brake coupling rod,
the relay shaft being rotatably provided in a lateral direction of the vehicle on the rear side of the vehicle body with respect to the mowing apparatus and on the front side of the vehicle body with respect to the left and right pair of rear wheel drive apparatuses,
the pedal coupling rod extending in the front-rear direction of the vehicle body above the mowing apparatus and connecting to the brake pedal and to the relay shaft,
the left brake coupling rod extending in the front-rear direction of the vehicle body and connecting to a left end of the relay shaft and to the operation portion of the left rear wheel brake, and
the right brake coupling rod extending in the front-rear direction of the vehicle body and connecting to a right end of the relay shaft and the operation portion of the right rear wheel brake, and wherein:
the relay shaft is arranged in a longitudinal direction of the riding type mower posteriorly to the cutting blade housing and the guiding pulley, and anteriorly to the plurality of driving cases, the plurality of input pulleys, the propelling output pulley, the cutting blade output pulley, and the drive transmission belt,
the relay shaft is arranged in a vertical direction of the riding type mower above the cutting blade housing, the cutting blade transmission belt, the guiding pulley, the plurality of driving cases, the cutting blade output pulley, and
the relay shaft is arranged in a space formed by the upwardly sloping portion.

6. A riding type mower including a self-propelled vehicle and a mowing apparatus, the riding type mower comprising:
a cutting blade housing;
a plurality of driving cases;
a plurality of input pulleys;
a guiding pulley;
a propelling output pulley;
a cutting blade output pulley;
a cutting blade transmission belt;
a drive transmission belt;
a coupling mechanism coupling a brake pedal provided to a driver step with operation portions of left and right pair of rear wheel brakes,
the coupling mechanism including:
a relay shaft;
a pedal coupling rod;
a left brake coupling rod; and
a right brake coupling rod,
the relay shaft being rotatably provided in a lateral direction of the vehicle on the rear side of the vehicle body with respect to the mowing apparatus and on the front side of the vehicle body with respect to left and right pair of rear wheel drive apparatuses,
the pedal coupling rod extending in the front-rear direction of the vehicle body above the mowing apparatus and connecting to the brake pedal and to the relay shaft,
the left brake coupling rod extending in the front-rear direction of the vehicle body and connecting to a left end of the relay shaft and to the operation portion of the left rear wheel brake, and
the right brake coupling rod extending in the front-rear direction of the vehicle body and connecting to a right end of the relay shaft and the operation portion of the right rear wheel brake, and wherein:
the relay shaft is arranged in a longitudinal direction of the riding type mower posteriorly to the cutting blade housing and the guiding pulley, and anteriorly to the plurality of driving cases, the plurality of input pulleys, the propelling output pulley, the cutting blade output pulley, and the drive transmission belt; and
the relay shaft is arranged in a vertical direction of the riding type mower above the cutting blade housing, the cutting blade transmission belt, the guiding pulley, the plurality of driving cases, the cutting blade output pulley.

* * * * *

UNITED STATES PATENT AND TRADEMARK OFFICE
CERTIFICATE OF CORRECTION

| | | |
|---|---|---|
| PATENT NO. | : 8,522,912 B2 | Page 1 of 1 |
| APPLICATION NO. | : 13/421080 | |
| DATED | : September 3, 2013 | |
| INVENTOR(S) | : M. Yamada et al. | |

It is certified that error appears in the above-identified patent and that said Letters Patent is hereby corrected as shown below:

In the Claims:

At column 14, line 13 (claim 2, line 3) of the printed patent, please change "above a the" to -- above the --.

Signed and Sealed this
Twenty-ninth Day of April, 2014

Michelle K. Lee
*Deputy Director of the United States Patent and Trademark Office*